United States Patent
Zhao et al.

(10) Patent No.: US 11,530,150 B2
(45) Date of Patent: Dec. 20, 2022

(54) METHOD AND SYSTEM FOR PREPARING DRINKING WEAK ALKALI WATER AND STRONTIUM-RICH ELECTROLYTE RAW WATER FROM SALT-MAKING DISTILLED WATER

(71) Applicants: Xuebing Zhao, Beijing (CN); Dehua Liu, Beijing (CN); Ziyuan Zhou, Beijing (CN); Lingmei Dai, Beijing (CN); Chenghua Zou, Sichuan (CN)

(72) Inventors: Xuebing Zhao, Beijing (CN); Dehua Liu, Beijing (CN); Ziyuan Zhou, Beijing (CN); Lingmei Dai, Beijing (CN); Chenghua Zou, Sichuan (CN)

(73) Assignees: TSINGHUA UNIVERSITY, Beijing (CN); SICHUAN ZIGONG CHI YU SALT PRODUCTCO., LTD., Sichuan (CN)

( * ) Notice: Subject to any disclaimer, the term of this patent is extended or adjusted under 35 U.S.C. 154(b) by 99 days.

(21) Appl. No.: 17/076,835

(22) Filed: Oct. 22, 2020

(65) Prior Publication Data
US 2021/0114910 A1 Apr. 22, 2021

(51) Int. Cl.
*B01D 37/00* (2006.01)
*B01D 61/58* (2006.01)
(Continued)

(52) U.S. Cl.
CPC .............. *C02F 9/00* (2013.01); *B01D 61/58* (2013.01); *C02F 1/283* (2013.01); *C02F 1/441* (2013.01);
(Continued)

(58) Field of Classification Search
CPC .. C02F 9/00; C02F 1/283; C02F 1/441; C02F 1/444; C02F 1/70; C02F 2301/06; C02F 2303/04; C02F 1/004; C02F 1/32; C02F 1/78; C02F 1/442; C02F 2301/063; C02F 1/001; C02F 1/06; C02F 1/44;
(Continued)

(56) References Cited

U.S. PATENT DOCUMENTS 8,808,537 B1 * 8/2014 Livingston ............ B01D 61/18
 210/260
9,301,542 B1 * 4/2016 Apblett .................. C02F 1/281
(Continued)

*Primary Examiner* — Joseph W Drodge

(57) ABSTRACT

The invention provides a method for preparing drinking weak alkali water and strontium-rich electrolyte raw water from distilled water obtained in the process of producing salt from well and mine brine, which comprises procedures of pressure reduction treatment, primary filtration, membrane separation treatment, activated carbon adsorption treatment, secondary filtration treatment, sterilization and disinfection treatment and the like on the salt-making distilled water in sequence so as to remove insoluble solid impurities, sulfides, microorganisms and other substances in the raw water, and separate or enrich ions, thereby preparing the weak alkali water suitable for drinking and the strontium-rich electrolyte raw water capable of being used for functional beverage production. The method provided by the invention can not only realize the comprehensive utilization of resources, but also obtain new products, significantly improving the economical efficiency of the process.

6 Claims, 1 Drawing Sheet

(51) Int. Cl.
*C02F 1/28* (2006.01)
*C02F 1/44* (2006.01)
*C02F 9/00* (2006.01)
*C02F 1/70* (2006.01)

(52) U.S. Cl.
CPC ............ *C02F 1/444* (2013.01); *C02F 1/70* (2013.01); *C02F 2301/06* (2013.01); *C02F 2303/04* (2013.01)

(58) Field of Classification Search
CPC ............ C02F 2209/02; C02F 2209/03; C02F 2209/44; C02F 2301/08; C02F 2303/02; C02F 1/04; C02F 1/281; C02F 1/467; C02F 2209/08; C02F 2303/08; B01D 36/00; B01D 36/02; B01D 37/00; B01D 61/02; B01D 61/025; B01D 61/027; B01D 61/04; B01D 61/10; B01D 61/14; B01D 61/142; B01D 61/145; B01D 61/147; B01D 61/16; B01D 61/20; B01D 61/58; B01D 2311/04; B01D 2311/06; B01D 2311/08; B01D 2311/2619; B01D 2311/2623; B01D 2311/2626; B01D 2311/2649; B01D 2311/2669; B01D 2311/2692; C22B 26/20
See application file for complete search history.

(56) References Cited

U.S. PATENT DOCUMENTS

| | | | | |
|---|---|---|---|---|
| 10,273,560 | B2* | 4/2019 | Ryu | C02F 1/28 |
| 2009/0101583 | A1* | 4/2009 | Perry | C02F 9/00 |
| | | | | 210/664 |
| 2009/0242485 | A1* | 10/2009 | Cabados | C02F 9/005 |
| | | | | 210/652 |
| 2011/0257788 | A1* | 10/2011 | Wiemers | C02F 1/28 |
| | | | | 700/271 |
| 2012/0234765 | A1* | 9/2012 | SenGupta | B01J 47/011 |
| | | | | 210/180 |
| 2013/0313191 | A1* | 11/2013 | Wolf | C02F 9/00 |
| | | | | 210/638 |
| 2015/0175445 | A1* | 6/2015 | Balidas | C02F 1/48 |
| | | | | 210/295 |
| 2016/0176739 | A1* | 6/2016 | Ukai | C02F 1/683 |
| | | | | 210/639 |
| 2017/0029920 | A1* | 2/2017 | Ryu | B01J 20/20 |
| 2017/0203979 | A1* | 7/2017 | Tarquin | B01D 69/08 |
| 2018/0134586 | A1* | 5/2018 | Weston | C02F 1/02 |
| 2019/0225521 | A1* | 7/2019 | Heath | B08B 3/08 |
| 2019/0263686 | A1* | 8/2019 | Karren | B08B 3/08 |
| 2019/0263691 | A1* | 8/2019 | Karren | C02F 1/46109 |
| 2020/0198995 | A1* | 6/2020 | Ganzi | C02F 1/4693 |

* cited by examiner

METHOD AND SYSTEM FOR PREPARING DRINKING WEAK ALKALI WATER AND STRONTIUM-RICH ELECTROLYTE RAW WATER FROM SALT-MAKING DISTILLED WATER

BACKGROUND OF THE INVENTION

1. Field of the Invention

The invention relates to the field of food, specifically relating to a method and a system for preparing drinking weak alkaline water and strontium-rich electrolyte raw water by using by-product distilled water obtained in the process of producing salt from mine brine as a raw material.

2. Description of the Related Art

Common salt, also called table salt, is one of the most important substances for human survival as well as the most commonly used seasoning in cooking. The main component of common salt is sodium chloride. The common salt can be divided into crude salt and refined salt. The crude salt is prepared from seawater, mineral salt water solution, souse of salt well, and salt water of salt pond by decocting, drying in the sun, filtering, concentrating, and crystallizing. Refined salt is produced by recrystallizing the crude salt and chemically removing impurities such as sulfates and sodium carbonate in alkali metal and alkaline earth metal. Both crude and refined salt preparations involve evaporation and concentration, i.e., the bittern solution is evaporated to remove water to concentrate the bittern. In the process of preparing common salt from well and mine bittern, 2-3 tons of water are evaporated when 1 ton of common salt is produced, and most of distilled water is directly discharged except that part of distilled water returns to underground to dissolve salt mine, bringing about resource waste.

Bittern contains various kinds of elements, and a small amount of elements are inevitably introduced into distilled water during evaporation. Among them, strontium is an element beneficial to the human body. Strontium, one of essential trace elements in human body, is closely related to the formation of human skeleton and is the main component of skeleton and teeth. Strontium exists in all tissues of human body and has competitive adsorption sites with sodium in intestines, which can decrease adsorption of sodium in human body and facilitate normal cardiovascular activities. (Wu Maojiang. Strontium and Human Health. Studies of Trace Elements and Health, 2012, 29(5): 66-67). Strontium can be used for treating convulsion due to parathyroid insufficiency, and strontium deficiency can incur dental caries. The strontium amount in food is related with the strontium amount in local water quality and soil, and generally, intake of 2 mg strontium each day can meet an adult's physiological needs (Wu Maojiang. Strontium and Human Health. Studies of Trace Elements and Health, 2012, 29(5): 66-67). On the other hand, although distilled water for salt production belongs to distilled water to some extent, sodium ions are inevitably brought in during evaporation and the concentration thereof is usually more than 50 ppm or even higher, which influences the taste of the water. In addition, the distilled water obtained in the salt making process is alkaline water and the pH thereof is too high to be directly drunk. What's more, some functional electrolyte beverages sold on the market often need to be supplemented with electrolyte during the preparation process, such as sodium chloride and other minerals. Based on above analysis, if the salt-making distilled water can be treated, particularly treated with separation and enrichment of ions, the weak alkaline water suitable for drinking and the electrolyte raw water rich in strontium ions can be obtained for producing functional beverages, thus realizing the high-valued comprehensive utilization of the salt-making distilled water. However, the key technical difficulties of pH adjustment, impurity and peculiar smell removal, ion separation and regulation of the distilled water for salt production and the like need to be solved for realizing the purpose.

SUMMARY OF THE INVENTION

The invention aims to solve one of the technical problems in the related technology to at least a certain extent, and prepare the distilled water obtained in the salt making process into weak alkaline drinking water and electrolyte raw water which can be used for producing functional beverages so as to realize the comprehensive utilization of resources and significantly improves the process economic benefit.

The invention is provided based on the following findings of the inventors: the brine containing salt is evaporated and concentrated to obtain salt and distilled water. The brine contains a large amount of sodium chloride as well as some trace elements, such as strontium. Sodium ions, strontium ions, calcium ions and the other ions are inevitably brought into the distilled water during the evaporation process, but the content of these ions is much lower compare with that of brine, wherein the content of the sodium ions is usually more than 40 ppm, the content of the calcium ions below 10 ppm, and the content of strontium elements usually below 0.4 ppm. On the other hand, since the distilled water for salt production is derived from natural brine, and the distilled water is alkaline due to the evaporation process in the salt production process and the pH value thereof is usually more than 9.5, so the distilled water can be used as raw water for preparing drinking weak alkaline water, but the pH adjustment is required. In addition, the taste of the drinking water is affected by too high content of sodium ions, and additional salt is often required to be added when preparing the electrolyte functional beverage so as to increase the content of ions (including sodium ions, potassium ions, magnesium ions, calcium ions and the like) thereof, wherein the content of the sodium ions can be as high as 500 mg/L. In addition, the distilled water for preparing salt also contains strontium element, and can prepare strontium-rich electrolyte raw water by enrichment, and can supplement strontium element while supplementing electrolyte for human body when preparing electrolyte beverage. Distilled water may also contain trace amounts of sulfides such as hydrogen sulfide and the like, which must be removed to meet drinking water standards. The solubility of hydrogen sulfide in water is affected by temperature and pressure and can be removed by pressure reduction. Solid impurities in the distilled water can be removed through physical filtration and the content of ions such as sodium ions and strontium ions can be adjusted through membrane separation treatment, and particularly be controlled by combining reverse osmosis membrane separation. Accordingly, the salt-making distilled water can be prepared into qualified drinking water products by combining a series of treatment units.

To this end, it is an object of the invention to provide a method and system for producing drinking weak alkali water and strontium-rich electrolyte raw water from distilled water.

In one aspect of the invention, a method is provided for preparing drinking weak alkali water and strontium-rich electrolyte raw water. According to the embodiment of the invention, the method comprises: (1) carrying out pressure reduction treatment on the salt making distilled water to obtain first treated water; (2) conducting primary filtration treatment on said first treated water to obtain second treated water; (3) performing membrane separation treatment on said second treated water to respectively obtain permeated water and retentate water; (4) performing activated carbon adsorption treatment on the permeated water to obtain third treated water A; performing activated carbon adsorption treatment on the retentate water to obtain third treated water B; (5) carrying out secondary filtration treatment on the third treated water A to obtain fourth treated water A; carrying out secondary filtration treatment on the retentate water to obtain fourth treated water B; and (6) sterilizing and disinfecting the fourth treated water A to obtain drinking weak alkaline water; and sterilizing and disinfecting the fourth treated water B to obtain strontium-rich electrolyte raw water. The method, using distilled water obtained by evaporating and concentrating salt-making brine as raw material, can effectively remove impurities such as sulfide in the salt-making distilled water, reject or enrich ions in the water sample via membrane separation treatment so as to respectively obtain permeated water suitable for preparing drinking weak-alkali water and retentate water suitable for preparing strontium-rich electrolyte raw water, and further respectively obtain drinking weak-alkali water and strontium-rich electrolyte raw material products via secondary filtration treatment and sterilization and disinfection treatment.

In addition, the method for preparing drinking weak alkali water and strontium-rich electrolyte raw water according to the above embodiment of the invention may also possess the following additional technical features:

In some embodiments of the invention, the operating conditions of said pressure reduction treatment include: the pressure is 0.01-0.09 MPa, the temperature is 30-80° C., and the retention time is 1-60 minutes.

In some embodiments of the invention, the operating conditions of said primary filtration process include: the pressure is 0.1-0.5 MPa, the temperature is 20-70° C., and the retention time is 1-30 minutes.

In some embodiments of the invention, said pressure reduction treatment and said primary filtration treatment are performed simultaneously.

In some embodiments of the invention, the operating conditions of said membrane separation process include: the temperature is 20-50° C., the pressure is 0.1-2 MPa, the retention time is 1-120 minutes, and the concentration ratio is 10:(9-1).

In some embodiments of the invention, the operating conditions of said activated carbon adsorption process include: the temperature is 20-40° C., and the retention time is 10-60 minutes.

In some embodiments of the invention, the operating conditions of said secondary filtration process include: the pressure is 0.1-1.0 MPa, the temperature is 20-40° C., and the concentration ratio is 10:(1-0.5).

In some embodiments of the invention, the operating conditions of said sterilization and disinfection process include: the temperature is 20-40° C., the ozone dosage is 1-10 g/L water, and the retention time is 1-30 minutes.

In another aspect of the invention, it provides a system for implementing the method of the above embodiments for preparing drinking weak alkaline water and strontium-rich electrolyte raw water. According to the embodiment of the invention, the system comprises: the pressure reduction treatment unit, the primary filtration unit, the membrane separation unit, the activated carbon adsorption treatment unit, the secondary filtration unit, the sterilization and disinfection treatment unit connected in sequence. By using the system, the salt-making distilled water can be continuously made into drinking weak alkali water and strontium-rich electrolyte raw water.

In addition, the system for implementing the method for preparing drinking weak alkaline water and strontium-rich electrolyte raw water according to the above embodiment of the invention may also have the following additional technical features:

In some embodiments of the invention, said pressure reduction treatment unit comprises a flash apparatus or a pressure reduction filtration apparatus.

In some embodiments of the invention, said primary filtration unit comprises a sand filtration device or a microfiltration device.

In some embodiments of the invention, the membrane separation unit comprises a nanofiltration device or a reverse osmosis device.

In some embodiments of the invention, the secondary filtration unit comprises a microfiltration device or an ultrafiltration device.

Additional aspects and advantages of the invention will be set forth in part in the description which follows and, in part, will be obvious from the description, or may be learned by practice of the invention.

BRIEF DESCRIPTION OF THE DRAWINGS

The above and/or additional aspects and advantages of the invention will become apparent and readily appreciated from the following description of the embodiments, taken in combination with the accompanying drawings thereof.

REFERENCE NUMERALS

Figure 1:
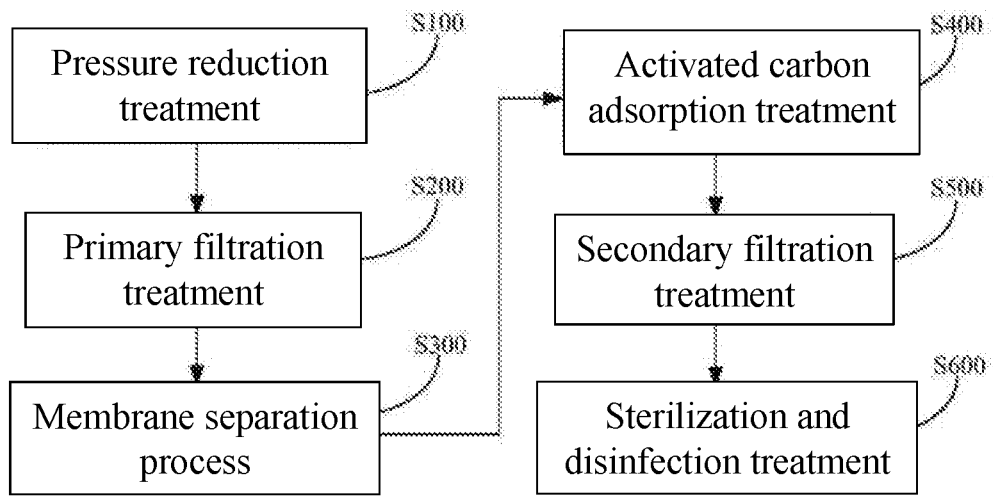
FIG. 1 is a schematic flow diagram illustrating the method for preparing drinking weak alkaline water and strontium-rich electrolyte raw water according to one embodiment of the invention.
Figure 2:
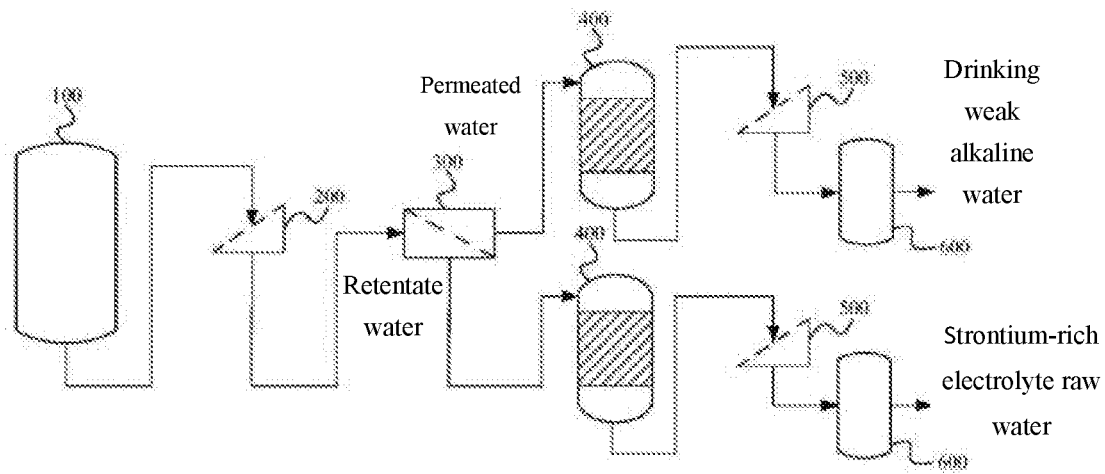
FIG. 2 is a schematic diagram illustrating the system structure for preparing drinking weak alkali water and strontium-rich electrolyte raw water according to one embodiment of the invention.

100: the pressure reduction treatment unit; 200: the primary filtration unit; 300: the membrane separation unit; 400: the activated carbon adsorption treatment unit; 500: the secondary filtration unit; 600: the sterilization and disinfection treatment unit.

DETAILED DESCRIPTION OF THE PREFERRED EMBODIMENTS

Reference will now be made in detail to embodiments of the invention, examples of which are illustrated in the drawings, wherein identical or similar reference numerals refer to the same or similar elements or elements with identical or similar function throughout. The embodiments described below with reference to the drawings are illustrative and intended to be illustrative of the invention and are not to be construed as limiting the invention. The specific techniques or conditions not specified in the examples should be viewed as the techniques or conditions described in the literature of the field or according to the product description Furthermore, the terms "first," "second," "third," "fourth," and the like are used for descriptive purposes only and are not to be construed as indicating or implying relative importance or implicit to the number of indicated technical features. Thus, features defined as "first," "second," "third," "fourth," etc. may explicitly or implicitly include at least one such feature. In the description of the invention, "a plurality" means at least two, e.g., two, three, etc., unless specifically limited otherwise.

In the invention, unless otherwise expressly specified or limited, the terms "connected" and other terms are to be construed broadly, e.g., as either fixed connection, removable connection, or an integral part; and can be mechanically or electrically connected; they may be directly connected or indirectly connected via intervening media, or they may be connected internally or in interactive relationship, unless expressly stated otherwise. The specific meanings of the above terms in the invention can be understood by those skilled in the art according to specific situations.

In one aspect of the invention, a method is provided for preparing drinking weak alkali water and strontium-rich electrolyte raw water. According to the embodiment of the invention, the method comprises: (1) carrying out pressure reduction treatment on the salt making distilled water to obtain first treated water; (2) conducting primary filtration treatment on said first treated water to obtain second treated water; (3) performing membrane separation treatment on said second treated water to respectively obtain permeated water and retentate water; (4) performing activated carbon adsorption treatment on the permeated water to obtain third treated water A; performing activated carbon adsorption treatment on the retentate water to obtain third treated water B; (5) carrying out secondary filtration treatment on the third treated water A to obtain fourth treated water A; carrying out secondary filtration treatment on the retentate water to obtain fourth treated water B; and (6) sterilizing and disinfecting the fourth treated water A to obtain drinking weak alkaline water; and sterilizing and disinfecting the fourth treated water B to obtain strontium-rich electrolyte raw water. The method, using distilled water obtained by evaporating and concentrating salt-making brine as raw material, can effectively remove impurities such as sulfide in the salt-making distilled water, reject or enrich ions in the water sample via membrane separation treatment so as to respectively obtain permeated water suitable for preparing drinking weak-alkali water and retentate water suitable for preparing strontium-rich electrolyte raw water, and further respectively obtain drinking weak-alkali water and strontium-rich electrolyte raw material products via secondary filtration treatment and sterilization and disinfection treatment.

The method for preparing drinking weak alkali water and strontium-rich electrolyte raw water according to one embodiment of the invention is further described in detail with reference to FIG. 1. According to an embodiment of the invention, the method comprises:

S100: Pressure Reduction Treatment

In the step, the salt-making distilled water is subjected to pressure reduction treatment to obtain first treated water. Generally, water with a pH of 6.4 or less is called acidic water, water with a pH of 6.5 to 8.0 is called neutral water, and water with a pH of 8.0 or more is called alkaline water. It is recognized that weak alkaline water is beneficial to the removal of acidic waste in the body, and that frequent drinking of weak alkaline water is beneficial to health. The natural characteristics of the brine makes the brine salt-making distilled water exhibits alkalinity and can be used as raw water for producing drinking weak alkaline water. However, since a certain amount of sulfides such as hydrogen sulfide are often dissolved in well brine, a small amount of hydrogen sulfide inevitably remains in distilled water. Since the solubility of gas in water is affected by temperature and pressure, sulfide impurities such as hydrogen sulfide in water can be removed by pressure reduction treatment.

According to some embodiments of the invention, the operating conditions of said pressure reduction treatment include: the pressure is 0.01-0.09 MPa, the temperature is 30-80° C., and the retention time is 1-60 minutes. Specifically, the pressure may be 0.01 MPa, 0.03 MPa, 0.05 MPa, 0.08 MPa, 0.09 MPa or the like, the temperature may be 30° C., 40° C., 50° C., 60° C., 80° C. or the like, and the retention time (i.e., the time for subjecting the salt-making distilled water to the pressure reduction treatment) may be 1 minute, 5 minutes, 15 minutes, 30 minutes, 45 minutes, 60 minutes or the like. By carrying out the pressure reduction treatment under said conditions, most of hydrogen sulfide remained in the salt-making distilled water can be removed and the sulfide content of the product meets the drinking water standard.

S200: Primary Filtration Treatment

In the step, the first treated water is subjected to primary filtration treatment to obtain second treated water. Distilled water obtained by evaporation of salt-making equipment may contain insoluble solid impurities such as iron filings and the like, which in the water sample can be effectively removed by physical filtration, such as sand filtration or microfiltration.

According to some embodiments of the invention, the operating conditions of said primary filtration process include: the pressure is 0.1-0.5 MPa, the temperature is 20-70° C., and the retention time is 1-30 minutes. Specifically, the pressure may be 0.1 MPa, 0.2 MPa, 0.3 MPa, 0.4 MPa, 0.5 MPa, etc., the temperature may be 20° C., 30° C., 40° C., 50° C., 70° C., etc., and the retention time (i.e., the time during which the first treated water is retained in the primary filtering unit) may be 1 minute, 5 minutes, 15 minutes, 30 minutes, etc. Because the distilled water for salt production is obtained by condensing brine after going through evaporation, and the content of solid impurities in the distilled water for salt production is low, and solid impurities in a water sample can be completely removed by adopting said operating conditions for primary filtration treatment and ensuring higher filtration water flux in the treatment process.

According to some embodiments of the invention, the above-mentioned pressure reduction treatment and the primary filtration treatment can be performed simultaneously, i.e., the second treated water is obtained by filtering and reducing pressure of the water sample simultaneously by using the pressure reduction and filtration device.

S300: Membrane Separation Process

In the step, the second treated water is subjected to membrane separation treatment to obtain permeated water and retentate water, respectively. In order to adjust the ion content in the second treated water, it is necessary to perform an ion rejection or enriching treatment, i.e., a membrane separation treatment. According to the embodiment of the invention, the preferred membrane separation treatment is preformed via reverse osmosis membrane filtration. The reverse osmosis membrane has good rejection effect on monovalent ions and divalent ions, and can be used as a preferable membrane separation device for producing purified water via ion removal and producing electrolyte raw water via ion enrichment.

According to some embodiments of the invention, the operating conditions of said membrane separation process include: the temperature is 20-50° C., the pressure is 0.1-2 MPa, the retention time is 1-120 minutes, and the concentration ratio is 10:(9-1). Specifically, the temperature may be 20° C., 30° C., 40° C., 50° C. or the like, the pressure may be 0.1 MPa, 0.5 MPa, 1 MPa, 1.5 MPa, 2 MPa or the like, the retention time (i.e., the time during which the second treated water stays in the membrane separation unit) may be 1 minute, 10 minutes, 30 minutes, 60 minutes, 90 minutes, 120 minutes or the like, and the concentration ratio may be 10:9, 10:6, 10:9, 10:5, 10:4, 10:3, 10:1 or the like. After the reverse osmosis membrane separation treatment, the ion concentration in the permeated water is obviously reduced, and the ion content in the retentate water is increased. The concentration ratio in the membrane separation process is defined as the ratio of the volume of the second treated water to the volume of the retentate water entering the membrane separation. Under the above operating conditions, the sodium ion content in the second treated water can be reduced to less than 10 ppm, and the divalent ion (such as calcium ion and strontium ion) content can be reduced to less than 0.02 ppm, i.e. the ion concentration in the permeated water is significantly reduced, and the total ion concentration is less than 10.5 ppm. In addition, the ion content in the retentate water is obviously increased, and according to different concentration ratios, the sodium ion content in the retentate water is 50-500 ppm, the strontium ion content is 0.4-4 ppm, and the calcium ion content is 5-50 ppm. Said ion content is suitable for being used as raw water for producing functional electrolyte beverage, and is rich in calcium and strontium ions beneficial to human body. Therefore, the enrichment of ions and the regulation of the ion content can be achieved by simply controlling the concentration ratio.

S400: Activated Carbon Adsorption Treatment

In the step, performing activated carbon adsorption treatment on the permeated water to obtain third treated water A; performing activated carbon adsorption treatment on the retentate water to obtain third treated water B. By performing the activated carbon adsorption treatment on the third treated water A, B, impurities such as peculiar smell and pigments that may exist in the third treated water A, B can be effectively removed. Preferably, the activated carbon adsorption treatment is a two-stage treatment, i.e., granular activated carbon adsorption treatment and powdered activated carbon adsorption treatment. The granular activated carbon adsorption treatment is used as coarse adsorption, and can remove most of impurities such as peculiar smell and pigment in water. The powdered activated carbon adsorption treatment is used for fine adsorption to remove impurities such as residual peculiar smell and pigment. The two-stage activated carbon adsorption treatment can effectively avoid defects of too large pressure drop and small water flux existing in the single use of powdered activated carbon adsorption and that of incomplete removal of impurities such as peculiar smell and pigments existing in the single use of granular activated carbon adsorption.

According to some embodiments of the invention, the conditions of the above activated carbon adsorption treatment include: the temperature is 20-40° C., and the retention time is 10-60 minutes. Specifically, the temperature may be 20° C., 30° C., 40° C. or the like, and the retention time (i.e., the time during which the third treated water A, B remains in the activated carbon adsorption treatment unit) may be 1 minute, 5 minutes, 15 minutes, 30 minutes, 45 minutes, 60 minutes or the like. Thus, impurities such as peculiar smell and pigments in the water can be completely removed.

S500: Secondary Filtration Treatment

In the step, the third treated water A is subjected to secondary filtration treatment to obtain fourth treated water A; and carrying out secondary filtration treatment on the third treated water B to obtain fourth treated water B. A trace amount of extremely fine solid particles may be brought into the third treated water A and B obtained after the activated carbon adsorption treatment, which can be effectively removed by performing secondary filtration treatment on the third treated water A and B. Preferably, the secondary filtration employs microfiltration or ultrafiltration.

According to some embodiments of the invention, the operating conditions of said secondary filtration process include: the pressure is 0.1-1.0 MPa, the temperature is 20-40° C., and the concentration ratio is 10:(1-0.5). Specifically, the pressure may be 0.1 MPa, 0.2 MPa, 0.5 MPa, 0.8 MPa, 1.0 MPa or the like, the temperature may be 20° C., 30° C., 40° C., 50° C. or the like, and the concentration ratio may be 10:1, 10:0.8, 10:0.6, 10:0.5 or the like. By subjecting the third treated water A and B to the secondary filtration treatment under said conditions, it is possible to substantially completely remove fine insoluble solid particles in the water sample.

S600: Sterilization and Disinfection Treatment

In the step, the fourth treated water A is sterilized and disinfected to obtain drinking weak alkaline water; and sterilizing and disinfecting the fourth treated water B to obtain strontium-rich electrolyte raw water. Specifically, the sterilization and disinfection treatment may be performed by a sterilization and disinfection method such as ultraviolet rays, ozone, hypochlorous acid, or the like.

According to some embodiments of the invention, the sterilization and disinfection process conditions include: the temperature is 20-40° C., the ozone dosage is 1-10 g/L water, and the retention time is 1-30 minutes. Specifically, the temperature may be 20° C., 30° C., 40° C. or the like, the amount of ozone may be 1 g/L water, 3 g/L water, 5 g/L water, 8 g/L water, 10 g/L water or the like, and the retention time (time the sterilization and disinfection treatment) may be 1 minute, 5 minutes, 15 minutes, 30 minutes or the like. Therefore, indexes such as microbial colony number in the obtained product can meet the national standard.

In another aspect of the invention, it provides a system for implementing the method of the above embodiments for preparing drinking weak alkaline water and strontium-rich electrolyte raw water. According to the embodiment of the invention, the system comprises: the pressure reduction treatment unit, the primary filtration unit, the membrane separation unit, the activated carbon adsorption treatment unit, the secondary filtration unit, the sterilization and disinfection treatment unit connected in sequence. By using the system, the salt-making distilled water can be continuously made into drinking weak alkali water and strontium-rich electrolyte raw water.

According to some embodiments of the invention, the pressure reduction treatment unit 100 is adapted to perform pressure reduction treatment on the salt making distilled water to obtain first treated water. The specific type of said pressure reduction treatment unit 100 is not particularly limited, and for example, a pressure reduction treatment apparatus commonly used in the art, preferably the flash apparatus or the pressure reduction filtration apparatus may be used.

According to some embodiments of the invention, the primary filtration unit 200 is adapted to perform primary filtration treatment on the first treated water to obtain the second treated water. The specific kind of the primary filtration unit 200 is not particularly limited, and for example, a filtration device commonly used in the art, preferably the sand filtration device or the microfiltration device, may be employed.

According to some embodiments of the invention, the membrane separation unit 300 is adapted to perform membrane separation treatment on the second treated water to obtain permeated water and retentate water, respectively. The specific kind of said membrane separation unit 300 is not particularly limited, and for example, a membrane separation device commonly used in the art, preferably the nanofiltration device or the reverse osmosis device, more preferably the reverse osmosis device, may be used.

According to some embodiments of the invention, the activated carbon adsorption treatment unit 400 is adapted to perform activated carbon adsorption treatment on the permeated water to obtain third treated water A and perform activated carbon adsorption treatment on the retentate water to obtain third treated water B. The specific type of said activated carbon adsorption treatment unit 400 is not particularly limited, and for example, the activated carbon adsorption column commonly used in the art may be used.

According to some embodiments of the invention, the secondary filtration unit 500 is adapted to perform a secondary secondary filtration treatment on the third treated water A to obtain fourth treated water A; and carrying out secondary filtration treatment on the third treated water B to obtain fourth treated water B. The specific type of the secondary filtration unit 500 is not particularly limited, and for example, a filtering apparatus commonly used in the art, preferably the microfiltration device or the ultrafiltration device may be used.

According to some embodiments of the invention, the sterilization and disinfection unit 600 is adapted to perform sterilization and disinfection treatment on the fourth treated water A to obtain drinking weak alkaline water; and sterilizing and disinfecting the fourth treated water B to obtain strontium-rich electrolyte raw water. The specific type of the sterilization and disinfection unit 600 is not particularly limited, and the sterilization and disinfection tank commonly used in the art may be used, for example.

The invention will now be described with reference to specific embodiments, which are intended to be illustrative only and not to be limiting in any way.

Embodiment 1

The distilled water for salt production is obtained from an industrialized five-effect evaporation salt production system of SICHUAN ZIGONG CHI YU SALT PRODUCT CO., LTD. The ICP analysis showed the main ion content of each effect condensate water as shown in Table 1. The ion contents of different effects are different, but gradually increase from the first effect to the fifth effect wherein the content of sodium ions is 0.6-60 ppm, the content of calcium ions is 2-13 ppm, and the content of strontium ions is 0.02-1 ppm. Therefore, the salt-making distilled water can be used as raw water for preparing drinking mineral water, but the ion enrichment or regulation is required to meet the standard requirements based on their different resources.

Table 1 Main ion content of distilled water for salt production by five-effect evaporation

|  | First effect | Second effect | Third effect | Fourth effect | Fifth effect |
| --- | --- | --- | --- | --- | --- |
| PH | 7.80 | 8.93 | 8.81 | 8.98 | 9.18 |
| Conductivity/(μs/cm) | 22.00 | 121 | 239 | 585 | 498 |
| $Na^+$/ppm | 0.62 | 9.74 | 11.93 | 54.49 | 53.13 |
| $Mg^{2+}$/ppm | 0.35 | 0.47 | 0.90 | 9.04 | 6.21 |
| $Ca^{2+}$/ppm | 2.88 | 3.10 | 4.06 | 18.93 | 12.77 |
| $Sr^{2+}$/ppm | 0.02 | 0.10 | 0.18 | 0.91 | 0.62 |
| Se/ppm | 0.00 | 0.01 | 0.01 | 0.00 | 0.00 |
| $Cl^-$/ppm | 2.44 | 16.19 | 21.59 | 140 | 124 |

Embodiment 2: Removal of Residual Hydrogen Sulfide in Salt-Making Distilled Water The sulfide contents of the distilled water of the first to fifth effects in embodiment 1 are measured to be 0.01 ppm, 0.02 ppm, 0.04 ppm, 0.05 ppm and 0.05 ppm, respectively, according to the method for measuring sulfide content in national standard GB 8538-2016 Methods for Examination of Drinking Natural Mineral Water. Treating the distilled water at room temperature (about 25° C.) by adopting pressure reduction suction filtration with the pressure of 1 kPa and the retention time is 30 minutes, then measuring the sulfide content in the water sample after the treatment is finished, and the results show that the sulfide content of the distilled water from the first effect to the fifth effect is less than 0.01 ppm and meets the national standard requirement of the sulfide content in drinking water Embodiment 3: Influence of Primary Filtration on the Ion Content Microfiltration is selected as the primary filtration, and the microfiltration membrane used is TORAY microfiltration membrane manufactured by Japan. A water sample containing 100 ppm of sodium ions, 20 ppm of calcium ions and 1 ppm of strontium ions is subjected to microfiltration membrane filtration continuously at room temperature (about 25° C.) under a pressure of 0.15 MPa with a membrane flux of natural flux (i.e., flux not controlled). And measuring the ion content of the filtered water sample by adopting ICP, wherein the measured sodium ion content is 102 ppm, the measured calcium ion content is 19.5 ppm and the measured strontium ion content is 0.96 ppm. Therefore, the ion content is not reduced basically when the microfiltration membrane is adopted for primary filtration treatment.

Embodiment 4: Analysis of Reverse Osmosis Membrane Separation Treatment Conditions A water sample with a sodium ion content of 100 ppm is treated with AG1812 reverse osmosis membrane manufactured by American General-purpose Company, and the sodium ion content in the permeated water and in the retentate water and the rejection rate of sodium ions under different operating pressures are shown in Table 2. It can be seen that reverse osmosis membranes have a higher rejection rate for sodium ions.

Table 2 Separation result of sodium ions with initial concentration of 100 ppm by reverse osmosis membrane of American General-purpose Company

| Operating pressure/MPa | C-feeding water/ppm | C-retentate water/ppm | C-permeated water/ppm | r(rejection rate)/% |
|---|---|---|---|---|
| 0.125 | 96.34 | 96.93 | 2.22 | 97.69 |
| 0.25 | 97.18 | 97.94 | 1.87 | 98.08 |
| 0.5 | 97.10 | 98.53 | 1.58 | 98.37 |

A water sample containing 10 ppm strontium ions is treated with the same reverse osmosis membrane, and the strontium ion content and strontium ion rejection in the permeated water and retentate water at different operating pressures are shown in Table 3. It can be known that reverse osmosis membranes also have a higher rejection rate for strontium ions.

Table 3 Separation result of strontium ions with initial concentration of 10 ppm by reverse osmosis membrane of American General-purpose Company

| Operating pressure/MPa | C-feeding water/ppm | C-retentate water/ppm | C-permeated water/ppm | r(rejection rate)/% |
|---|---|---|---|---|
| 0.125 | 7.45 | 7.52 | 0.37 | 94.98 |
| 0.25 | 7.48 | 7.68 | 0.37 | 95.12 |
| 0.5 | 7.52 | 7.70 | 0.35 | 95.32 |

The effect of different concentration ratios on the ion concentrations of the permeated water and retentate water is further analyzed as shown in Table 4 and Table 5.

Table 4 Influence of different concentration ratios on ion content in the retentate water in reverse osmosis membrane treating simulated water sample

| Concentration ratio | $Na^+$/ppm | $Sr^{2+}$/ppm | $Ca^{2+}$/ppm |
|---|---|---|---|
| 0 | 46.74 | 0.35 | 7.91 |
| 10:9 | 64.33 | 0.48 | 10.03 |
| 10:8 | 73.25 | 0.51 | 11.85 |
| 10:7 | 68.46 | 0.61 | 13.97 |
| 10:6 | 95.01 | 0.71 | 15.94 |
| 10:5 | 107.1 | 0.83 | 19.66 |
| 10:4 | 119.85 | 0.88 | 19.78 |
| 10:3 | 165.80 | 1.27 | 28.37 |
| 10:2 | 243.70 | 1.95 | 41.55 |
| 10:1 | 487.40 | 3.80 | 82.10 |

Table 5 Influence of different concentration ratios on ion content in permeated water in reverse osmosis membrane treating simulated water sample

| Concentration ratio | $Na^+$/ppm | $Sr^{2+}$/ppm | $Ca^{2+}$/ppm |
|---|---|---|---|
| 0 | 5.23 | 0.07 | 0.09 |
| 10:9 | 5.75 | 0.07 | 0.1 |
| 10:8 | 5.23 | 0.07 | 0.09 |
| 10:7 | 5.28 | 0.07 | 0.09 |
| 10:6 | 5.67 | 0.07 | 0.11 |
| 10:5 | 6.05 | 0.07 | 0.12 |
| 10:4 | 6.36 | 0.08 | 0.13 |
| 10:3 | 6.78 | 0.08 | 0.13 |
| 10:2 | 7.28 | 0.08 | 0.15 |
| 10:1 | 7.89 | 0.09 | 0.16 |

The above results show that the ion content in the retentate water is continuously increased along with the continuous increase of the concentration ratio, particularly the sodium ion content is more than 110 ppm when the concentration ratio is more than 10:4, and is close to 490 ppm when the concentration ratio is 10:1, which is within the range of the sodium ion content of the functional electrolyte beverage sold on the market; the strontium ion content is also obviously improved, and is in the range of 0.8-4 ppm, namely rich in strontium content or even high in strontium content. But the ion concentration in the permeated water does not change significantly. The results show that effective rejection of ions can be realized by adopting reverse osmosis membrane separation treatment; the obtained permeated water is suitable for preparing direct drinking purified water and effective enrichment of ions while the obtained retentate water is suitable for preparing electrolyte raw water for producing functional beverages, possessing higher strontium element content, and the ion content in the retentate water can be regulated and controlled by controlling the concentration ratio.

Embodiment 5: Activated Carbon Adsorption Treatment

The retentate water and the permeated water obtained by membrane separation treatment at a concentration ratio of 10:5 in embodiment 4 are further subjected to activated carbon adsorption treatment, respectively, and two-stage treatment is performed using granular activated carbon and powdered activated carbon, and the flow rate and the height of the activated carbon column layer are controlled so that the retention time of the water sample in each column is 10 minutes. The ion concentrations of the treated retentate water are 109.5 ppm of sodium ions, 16.56 ppm of calcium ions and 0.79 ppm of strontium ions respectively; the ion concentrations of the treated permeated water are 5.6 ppm of sodium ion, 0.10 ppm of calcium ion, and 0.06 ppm of strontium ion, respectively. It can be seen that the activated carbon adsorption treatment does not result in a significant change in sodium ion content, but the divalent ion (calcium and strontium) content is slightly reduced.

Embodiment 7: Analysis of Whole Process for Preparing Drinking Weak Alkali Water and Strontium-Rich Electrolyte Raw Water from Salt-Making Distilled Water The fifth-effect condensate water from SICHUAN ZIGONG CHI YU SALT PRODUCT CO., LTD is employed as raw material water, and the contents of sodium ions, calcium ions and strontium ions thereof are respectively measured to be 46.7 ppm, 7.9 ppm and 0.35 ppm; the sulfide content is 0.03 ppm. Subjecting the raw water to pressure reduction treatment under the absolute pressure of 1 kPa for 5 minutes, and measuring that the content of sulfide is less than 0.01 ppm; continuously filtering the water sample subjected to the pressure reduction treatment by microfiltration membrane under the pressure of 0.15 MPa, then separating by adopting reverse osmosis membrane, controlling the concentration ratio to be 10:2; the contents of sodium ion, calcium ion and strontium ion are respectively 250.1 ppm, 42.2 ppm and 1.98 ppm in the obtained retentate water and the contents of sodium ion, calcium ion and strontium ion in the obtained permeated water are 5.3 ppm, 0.08 ppm and 0.03 ppm, respectively. Then respectively performing activated carbon adsorption treatment and secondary microfiltration treatment on the retentate water and the permeated water, sterilizing and disinfecting for 10 minutes by adopting 2 g/L ozone, and detecting microorganisms, wherein both of the colony count and the total Escherichia coli count meet the national drinking mineral water standard. The water quality analysis of the correspondingly obtained aquatic products, as shown in the table below, indicating that the products meet the corresponding national standards of drinking water.

Table 6 Analysis of the water quality of the weak alkaline water prepared by the method of the invention and comparison with salt-making distilled water

| | Value | | |
|---|---|---|---|
| Index | Raw water (salt-making distilled water) | Weak alkaline water | Corresponding national standards |
| Conductivity | 314 μs/cm | 58.3 μs/cm | No requirement |
| PH | 9.77 | 8.53 | 6.5-9.5 |
| Sodium ion | 46.7 mg/L | 5.3 mg/L | Strontium ≥0.20 mg/L (when |
| Strontium ion | 0.35 mg/L | 0.08 mg/L | the content is 0.20-0.40 mg/L, |
| Calcium ion | 7.9 mg/L | 0.03 mg/L | the temperature for water source is above 25° C.) |
| Chloride ion | 69.87 mg/L | 0.46 mg/L | ≤250 mg/L |
| Sulfate ion | 12.85 mg/L | 0.29 mg/L | ≤250 mg/L |
| Sulfide | <0.02 mg/L | <0.02 mg/L | ≤0.02 mg/L |
| Colony count | — | 9 CFU/ml | ≤100 |
| *Escherichia coli* count | — | Not detected | Can't be detected |

Table 7 Analysis of water quality of strontium-rich electrolyte raw water prepared by the method of the invention and comparison with salt-making distilled water

| | Value | | |
|---|---|---|---|
| Index | Raw water (salt-making distilled water) | Electrolyte raw water | Corresponding national standards |
| Conductivity | 314 μs/cm | 58.3 μs/cm | No requirement |
| PH | 9.77 | 9.00 | 6.5-9.5 |
| Sodium ion | 46.7 mg/L | 250.1 mg/L | Strontium ≥0.20 mg/L (when |
| Strontium ion | 0.35 mg/L | 1.98 mg/L | the content is 0.20-0.40 mg/L, |
| Calcium ion | 7.9 mg/L | 42.2 mg/L | the temperature for water source is above 25° C.) |
| Chloride ion | 69.87 mg/L | 243.6 mg/L | ≤250 mg/L |
| Sulfate ion | 12.85 mg/L | 152.7 mg/L | ≤250 mg/L |
| Sulfide | <0.02 mg/L | <0.02 mg/L | ≤0.02 mg/L |
| Colony count | — | 11 CFU/ml | ≤100 |
| *Escherichia coli* count | — | Not detected | Can't be detected |

The results show that the method provided by the invention can be used for preparing the salt-making distilled water into drinking weak alkaline water meeting the national standard and electrolyte raw water used for preparing functional beverages, and can realize effective regulation of ion content.

In the description herein, references terms of "one embodiment," "some embodiments," "an example," "a specific example," or "some examples," etc., mean that a particular feature, structure, material, or characteristic described in connection with the embodiment or example is included in at least one embodiment or example of the invention. In this specification, the schematic representations of the terms used above are not necessarily intended to refer to the same embodiment or example. Furthermore, the particular features, structures, materials, or characteristics described may be combined in any suitable manner in any one or more embodiments or examples. Furthermore, various embodiments or examples and features of different embodiments or examples described in this specification can be combined and combined by one skilled in the art without contradiction.

The invention and its embodiments have been described above, but the description is not limited thereto; only one embodiment of the invention is shown in the drawings, and the actual structure is not limited thereto. In general, it is to be understood by those skilled in the art that non-creative design of structural forms and embodiments that are similar to the technical solutions without departing from the spirit of the invention shall all fall within the protective scope of the invention.

What is claimed is:

1. A method of preparing drinking weak alkali water and strontium-rich electrolyte raw water comprising:
    (1) carrying out pressure reduction treatment on a salt and electrolyte-containing, salt-making distilled water to obtain a first treated water;
    (2) conducting primary filtration treatment on said first treated water to obtain a second treated water;
    (3) performing membrane separation treatment on said second treated water to respectively obtain permeated water and retentate water;
    (4) performing activated carbon adsorption treatment on the permeated water to obtain third treated water A and performing activated carbon adsorption treatment on the retentate water to obtain a third treated water B;
    (5) carrying out secondary filtration treatment on the third treated water A to obtain fourth treated water A and carrying out secondary filtration treatment on the retentate water to obtain a fourth treated water B; and
    (6) sterilizing and disinfecting the fourth treated water A to obtain weak alkaline drinking water and sterilizing and disinfecting the fourth treated water B to obtain strontium-rich electrolyte raw water.

2. The method of claim 1 wherein said pressure reduction treatment is conducted at a pressure of between 0.01-0.09 MPa, a temperature of between 30-80° C. and for a retention time of between 1-60 minutes.

3. The method of claim 1 wherein said primary filtration treatment is conducted at a pressure of between 0.1-0.5 MPa, a temperature of between 20-70° C. and for a retention time of between 1-30 minutes.

4. The method of claim 1 wherein said pressure reduction treatment and said primary filtration treatment are performed simultaneously.

5. The method of claim 1 wherein said activated carbon adsorption process treatment is conducted at a temperature of between 20-40° C. and a retention time of between 10-60 minutes.

6. The method of claim 1 wherein said secondary filtration treatment on the third treatment water is conducted at a pressure of between 0.01-1.0 MPa and at a temperature of between 20-400 C.

\* \* \* \* \*